United States Patent
Shimasaki et al.

[11] Patent Number: 5,615,552
[45] Date of Patent: Apr. 1, 1997

[54] SECONDARY AIR PUMP CONTROL SYSTEM FOR INTERNAL COMBUSTION ENGINES

[75] Inventors: Yuichi Shimasaki; Takashi Komatsuda; Hiroaki Kato, all of Wako, Japan

[73] Assignee: Honda Giken Kogyo Kabushiki Kaisha, Tokyo, Japan

[21] Appl. No.: 510,169

[22] Filed: Aug. 2, 1995

[30] Foreign Application Priority Data

Aug. 23, 1994 [JP] Japan ................... 6-198836

[51] Int. Cl.⁶ ........................... F01N 3/32
[52] U.S. Cl. ........................... 60/277; 60/289
[58] Field of Search ............... 60/277, 289, 290

[56] References Cited

U.S. PATENT DOCUMENTS

| | | | |
|---|---|---|---|
| 5,140,810 | 8/1992 | Kuroda | 60/290 |
| 5,333,446 | 8/1994 | Itoh | 60/289 |
| 5,381,658 | 1/1995 | Meguro | 60/290 |
| 5,388,401 | 2/1995 | Nishizawa | 60/289 |
| 5,400,591 | 3/1995 | Aramaki | 60/289 |
| 5,519,992 | 5/1996 | Hosoya | 60/289 |

FOREIGN PATENT DOCUMENTS 4-22025 5/1992 Japan.

*Primary Examiner*—Douglas Hart
*Attorney, Agent, or Firm*—Nikaido, Marmelstein, Murray & Oram LLP

[57] ABSTRACT

A secondary air pump control system for an internal combustion engine having an air pump for supplying secondary air to the exhaust passage, comprises a voltage detector for detecting voltage applied to the air pump, a current detector for detecting current flowing through the air pump, and a switch for making a changeover between supply of electric power to the air pump and cutoff of same. The flow rate of secondary air supplied by the air pump is detected based on an output from the voltage detector and an output from the current detector. The operation of the switch is controlled based on the flow rate thus detected.

18 Claims, 11 Drawing Sheets

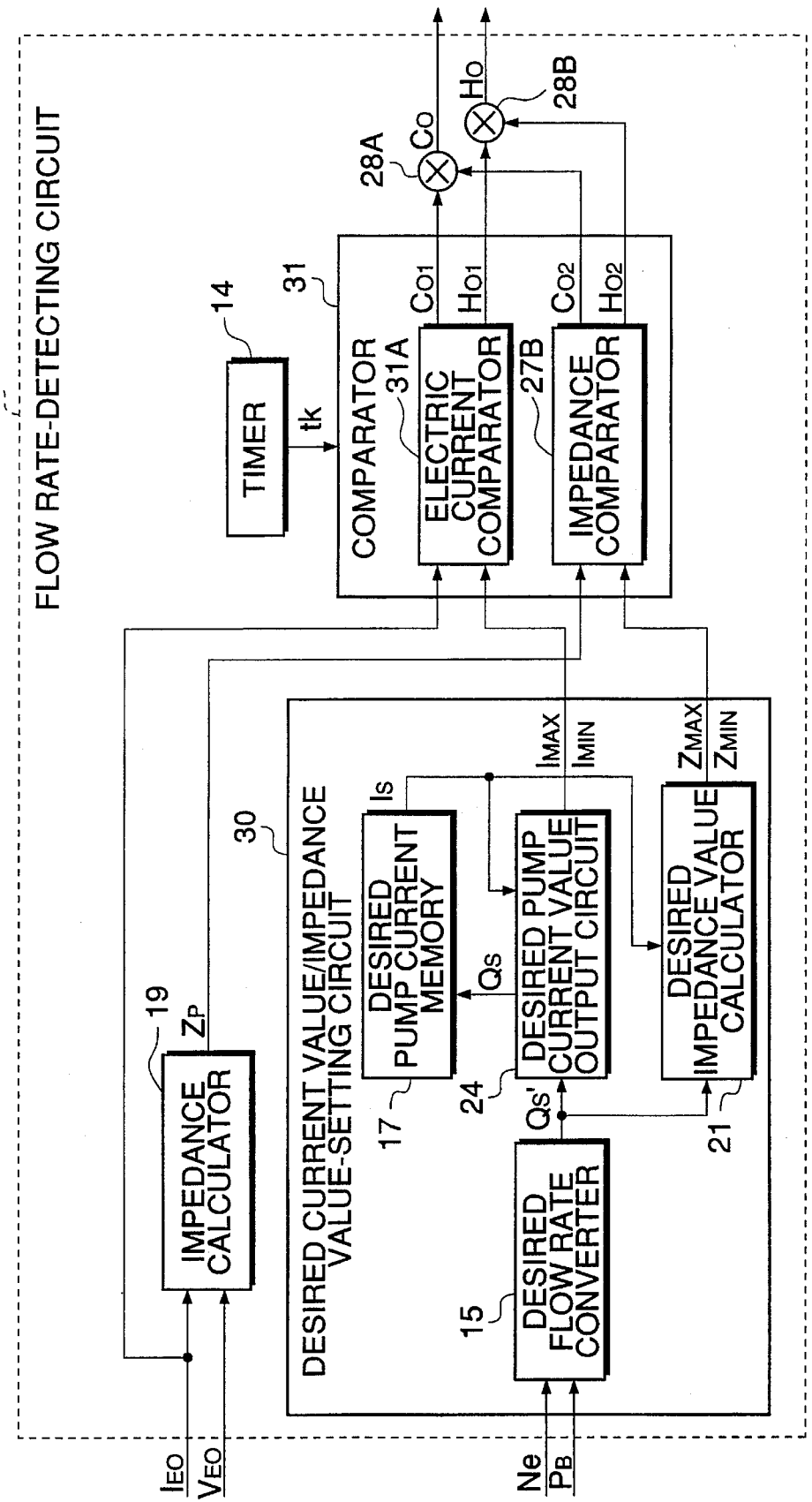

ately detecting ng exhaust gases

SECONDARY AIR PUMP CONTROL SYSTEM FOR INTERNAL COMBUSTION ENGINES

BACKGROUND OF THE INVENTION

1. Field of the Invention

This invention relates to a secondary air pump control system for internal combustion engines, which controls the operation of an air pump which supplies secondary air into the exhaust passage of the engine to purify exhaust gases emitted from the engine, and more particularly to a secondary air pump control system of this kind, which controls the flow rate of secondary air supplied by the air pump and/or detects abnormality of the air pump, by calculating the flow rate of secondary air, based on values of voltage and current of electric power supplied to the air pump.

2. Prior Art

There is conventionally employed in internal combustion engines, a secondary air pump control system which controls the supply of secondary air into the exhaust passage of the engine by driving and controlling an air pump to supply a suitable amount of secondary air to oxidize noxious components, such as carbon monoxide, in exhaust gases emitted from the engine or activate a catalytic converter provided in the exhaust system, to thereby purify noxious components in exhaust gases.

The conventional secondary air pump control systems include one proposed by Japanese Utility Model Publication (Kokoku) No. 4-22025, which regulates the flow rate of secondary air by means of a secondary air supply system having a reed valve (check valve) and a mechanical pump.

However, the conventional secondary air pump control systems including the proposed one are not provided with flow rate-detecting means for detecting the flow rate of secondary air. Therefore, the proposed secondary air pump control system is incapable of controlling the flow rate of secondary air supplied into the exhaust passage to suitable values appropriate to operating conditions of the engine.

Since the proposed air pump control system employs a reed valve and a mechanical pump as mentioned above, accurate control of the flow rate of secondary air depending on operating conditions of the engine is difficult to achieve.

Further, if an air flow sensor is employed to detect the flow rate of secondary air to carry out the air pump control, the flow rate of secondary air can be accurately detected, which, however, results in a high manufacturing cost.

Furthermore, the arrangement of such an air flow sensor in the exhaust passage may cause a pressure loss, depending on the layout thereof, which may incur a decrease in the flow rate of secondary air.

If an 02 sensor is employed, in place of the air flow sensor, to detect the flow rate of secondary air to carry out the air pump control, the 02 sensor can do nothing more than detecting whether or not there is a supply of secondary air into the exhaust passage. Therefore, the 02 sensor is not suitable for use as the flow rate sensor for secondary air control which has to be carried out with high accuracy.

Besides, the conventional secondary air pump control systems including the proposed one do not contemplate providing a failure-diagnosing function. Therefore, a secondary air pump control system having a failure-diagnosing function has been demanded.

SUMMARY OF THE INVENTION

It is an object of the invention to provide a secondary air pump control system for internal combustion engines, which is simple in construction and capable of accurately detecting the flow rate of secondary air for purifying exhaust gases in the exhaust passage of the engine.

It is another object of the invention to provide a secondary air pump control system for internal combustion engines, which is capable of performing a failure-diagnosing function of the system with high reliability.

To attain the first-mentioned object, the present invention provides a secondary air pump control system for an internal combustion engine having an exhaust passage, and an air pump for supplying secondary air to the exhaust passage, comprising:

voltage-detecting means for detecting voltage applied to the air pump;

current-detecting means for detecting current flowing through the air pump;

switch means for making a changeover between supply of electric power to the air pump and cutoff of same;

flow rate-detecting means for detecting a flow rate of secondary air supplied by the air pump, based on an output from the voltage-detecting means and an output from the current-detecting means; and switch control means for controlling operation of the switch means, based on an output from the flow rate-detecting means.

To attain the second-mentioned object, the secondary air pump control system according to the invention includes abnormality-detecting/warning means for detecting and warning an abnormality of the air pump, based on the output from the flow rate-detecting means.

In a preferred embodiment of the invention, the flow rate-detecting means comprises electric power-calculating means for calculating an actual value of pump power supplied to the air pump, based on the output from the voltage-detecting means and the output from the current-detecting means, desired power value-setting means for setting a desired value of the pump power to be supplied to the air pump, and comparing means for comparing the actual value of the pump power thus calculated with the desired value of the pump power thus set, and for determining the flow rate of secondary air supplied by the air pump, based on a result of the comparison.

Preferably, the desired power value-setting means sets the desired value of the pump power, based on operating conditions of the engine.

In another embodiment of the invention, the flow rate-detecting means comprises impedance-calculating means for calculating an actual value of pump impedance of the air pump, based on the output from the voltage-detecting means and the output from the current-detecting means, desired impedance value-setting means for setting a desired value of the pump impedance, and comparing means for comparing the actual value of the pump impedance thus calculated with the desired value of the pump impedance thus set, and for determining the flow rate of secondary air supplied by the air pump, based on a result of the comparison.

Preferably, the desired impedance value-setting means sets the desired value of the pump impedance, based on operating conditions of the engine.

In a further embodiment of the invention, the flow rate-detecting means comprises electric power-calculating means for calculating an actual value of pump power supplied to the air pump, based on the output from the voltage-detecting means and the output from the current-detecting means, desired power value-setting means for setting a desired value of the pump power to be supplied to the air pump, impedance-calculating means for calculating an actual value of pump impedance of the air pump, based on the output from the voltage-detecting means and the output from the current-detecting means, desired impedance value-setting means for setting a desired value of the pump impedance, and comparing means for comparing the actual value of the pump power thus calculated and the actual value of the pump impedance thus calculated with the desired value of the pump power thus set and the desired value of the pump impedance thus set, respectively, and for determining the flow rate of the secondary air supplied by the air pump, based on results of the comparisons.

In another embodiment of the invention, the flow rate-detecting means comprises impedance-calculating means for calculating an actual value of pump impedance of the air pump, based on the output from the voltage-detecting means and the output from the current-detecting means, desired impedance value-setting means for setting a desired value of the pump impedance, desired current value-setting means for setting a desired value of current to flow through the air pump, and comparing means for comparing the actual value of the pump impedance thus calculated and the actual value of the current detected by the current-detecting means with the desired value of the pump impedance thus set and the desired value of the current thus set, respectively, and for determining the flow rate of secondary air supplied by the air pump, based on results of the comparisons.

Preferably, the desired current value-setting means sets the desired value of the current, based on operating conditions of the engine.

Advantageously, the current-detecting means comprises a non-contact type detector.

According to another aspect of the invention, there is provided a secondary air pump control system for an internal combustion engine having an exhaust passage, and an air pump for supplying secondary air to the exhaust passage, comprising:

current-detecting means for detecting an actual value of current flowing through the air pump;

desired current value-setting means for setting a desired value of current to flow through the air pump, based on operating conditions of the engine;

switch means for making a changeover between supply of electric power to the air pump and cutoff of same;

flow rate-detecting means for comparing the actual value of the current thus detected with the desired value of the current thus set, and for determining a flow rate of secondary air supplied by the air pump, based on a result of the comparison; and switch control means for controlling operation of the switch means, based on an output from the flow rate-detecting means.

According to a further aspect of the invention, to attain the second-mentioned object, there is provided a secondary air pump control system for an internal combustion engine having an exhaust passage, and an air pump for supplying secondary air to the exhaust passage, comprising:

voltage-detecting means for detecting voltage applied to the air pump;

current-detecting means for detecting current flowing through the air pump;

switch means for making a changeover between supply of electric power to the air pump and cutoff of same;

flow rate-detecting means for detecting a flow rate of secondary air supplied by the air pump, based on an output from the voltage-detecting means and an output from the current-detecting means; and abnormality-detecting/warning means for detecting and warning an abnormality of the air pump, based on an output from the flow rate-detecting means.

According to a still further aspect of the invention, to attain the second-mentioned object, there is provided a secondary air pump control system for an internal combustion engine having an exhaust passage, and an air pump for supplying secondary air to the exhaust passage, comprising:

current-detecting means for detecting current flowing through the air pump;

desired current value-setting means for setting desired current to flow through the air pump, based on operating conditions of the engine;

switch means for making a changeover between supply of electric power to the air pump and cutoff of same;

flow rate-detecting means for comparing the electric current thus detected with the desired current value thus set, and for determining a flow rate of secondary air supplied by the air pump, based on a result of the comparison; and abnormality-detecting/warning means for detecting and warning an abnormality of the air pump, based on an output from the flow rate-detecting means.

The above and other objects, features, and advantages of the invention will become more apparent from the ensuing detailed description taken in conjunction with the accompanying drawings.

BRIEF DESCRIPTION OF THE DRAWINGS

FIG. 11 is a schematic block diagram showing the arrangement of a flow rate-detecting circuit, according to a fifth embodiment of the invention;

DETAILED DESCRIPTION

The invention will now be described in detail with reference to the drawings showing embodiments thereof.

Figure 1:
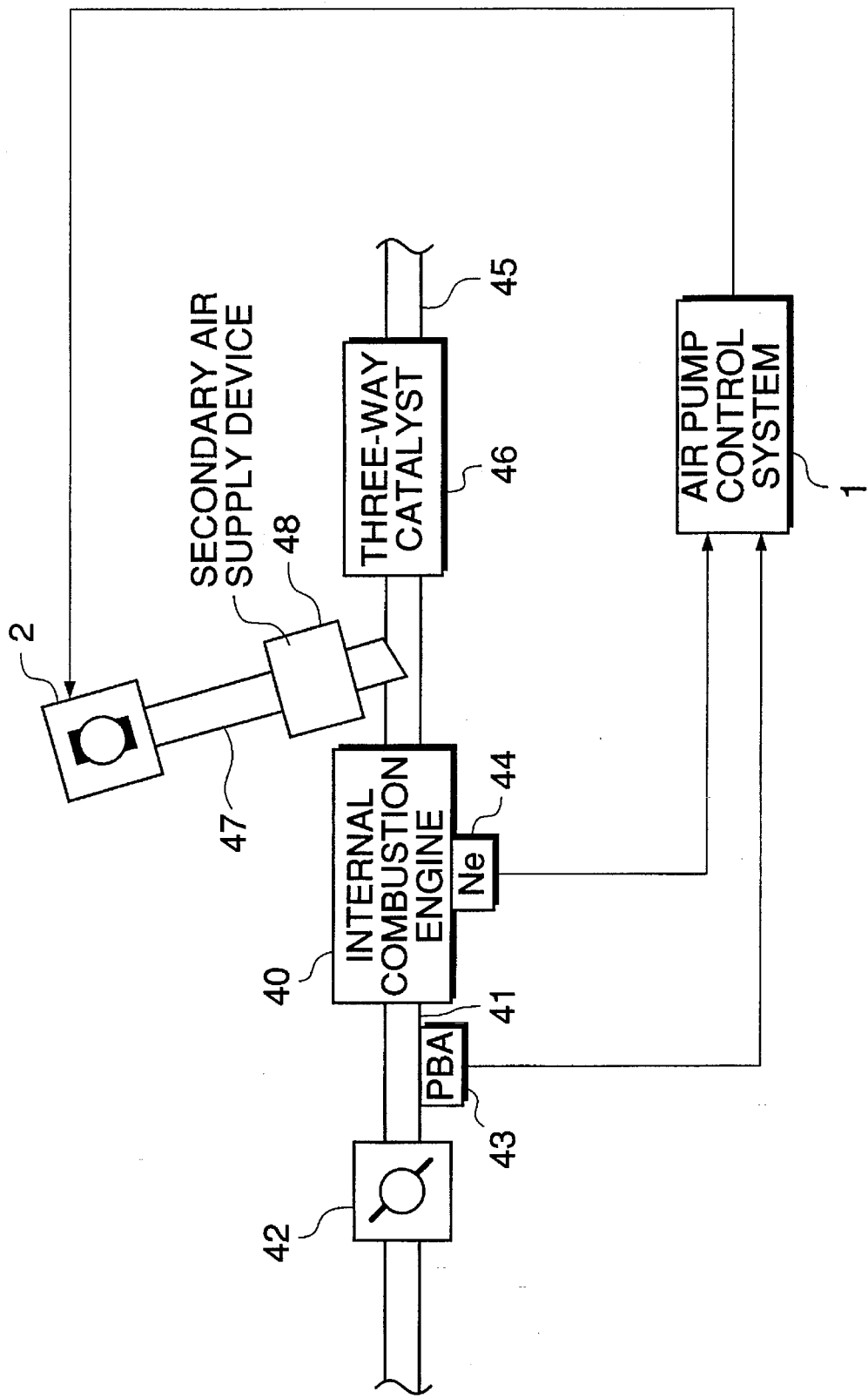
FIG. 1 is a schematic block diagram showing the arrangement of an internal combustion engine and a secondary air pump control system according to a first embodiment of the invention.

Referring first to FIG. 1, there is schematically illustrated the whole arrangement of an internal combustion engine and a secondary air pump control system therefor, according to a first embodiment of the invention.

In the figure, reference numeral 40 designates an internal combustion engine (hereinafter referred to as "the engine"), which has an intake pipe 41 in which a throttle valve 42 is arranged.

An intake pipe absolute pressure (PBA) sensor 43 communicates with the interior of the intake pipe 41 at a location downstream of the throttle valve 42, and is electrically connected to an air pump control system 1, to supply an electric signal indicative of the sensed absolute pressure PBA within the intake pipe 41 to the air pump control system 1.

An engine rotational speed (Ne) sensor 44 is arranged in facing relation to a camshaft or a crankshaft of the engine 1, neither of which is shown, and electrically connected to the air pump control system 1 to supply an electric signal indicative of the sensed engine rotational speed Ne to the system 1.

A three-way catalyst 46 is arranged in an exhaust pipe 45 of the engine 40 to purify noxious components, such as HC, CO, NOx, which are present in exhaust gases emitted from the engine.

An air passage 47 is connected at an end thereof to the exhaust passage 45 at a location upstream of the three-way catalyst 46. Connected to the other end of the air passage 47 is an air pump 2 which supplies secondary air into the exhaust passage 45 to purify noxious components in exhaust gases from the engine 40. A secondary air supply unit 48 is arranged across the air passage 47 at a location downstream of the air pump 2 to supply secondary air from the air pump 2 into the exhaust pipe 45. In the present embodiment, the secondary air supply unit 48 is comprised of a reed valve. Alternatively, the secondary air supply unit 48 may be comprised of an electromagnetic valve, or by a combination of a reed valve and an electromagnetic valve. The secondary air pump 2 has its ON/OFF operation controlled by a switch 5 (FIG. 2) forming part of the air pump control system 6.

Figure 2:
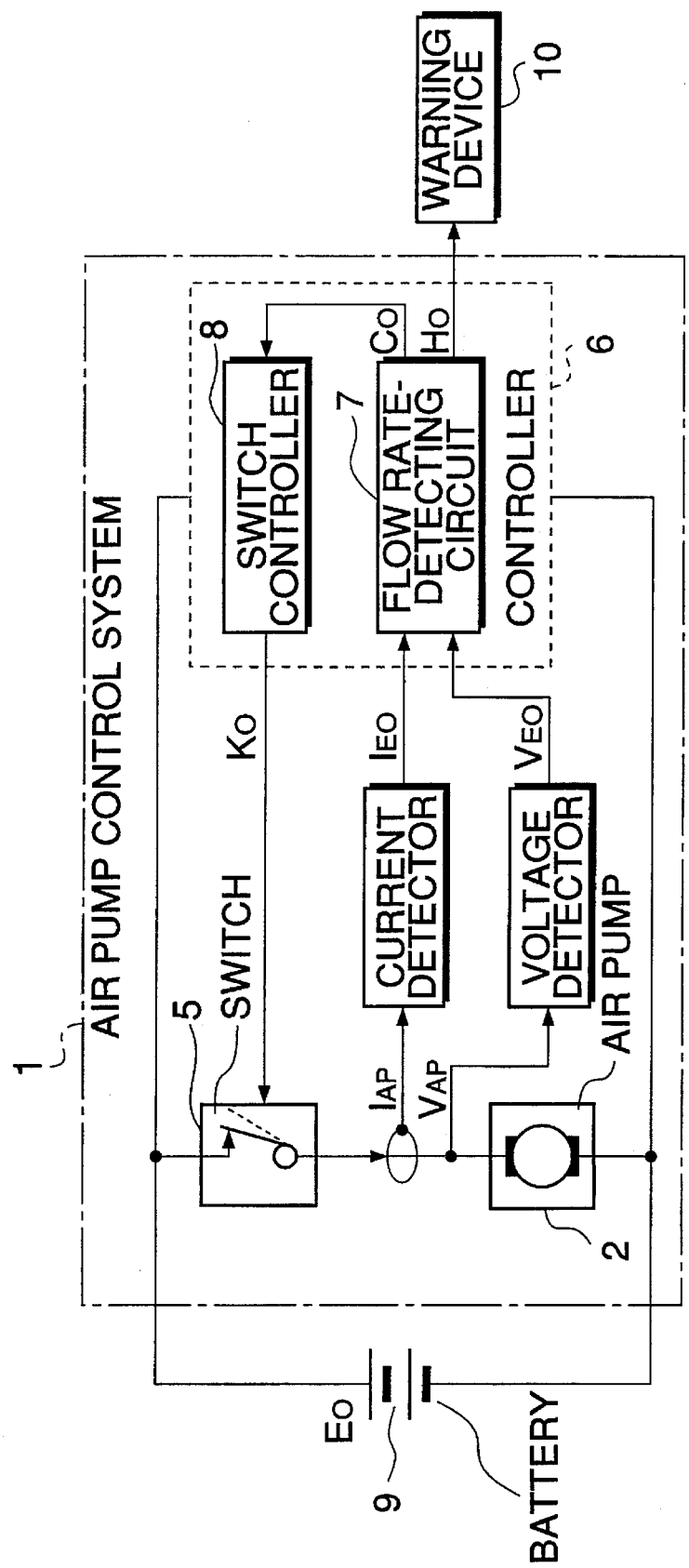
FIG. 2 is a schematic block diagram showing the arrangement of the secondary air pump control system.

FIG. 2 shows the arrangement of the secondary air pump control system 1 according to the first embodiment.

In the figure, the secondary air pump control system 1 is comprised of the air pump 2, a voltage detector 3 for detecting voltage $V_{AP}$ of electric power applied to the air pump 2 for driving the same, a current detector 4 for detecting current $I_{AP}$ of the electric power flowing through the air pump 2, the switch 5 for selecting supply and cutoff of the electric power to the air pump 2, and a controller 6 for calculating the flow rate of secondary air supplied by the air pump 2, based on a voltage signal $V_{E0}$ from the voltage detector 3 and a current signal $I_{E0}$ from the current detector 4, to thereby control switching of the switch 5 as well as control the operation of a warning device 10 upon detection of an abnormal state of the flow rate of secondary air supplied by the air pump 2.

The secondary air pump control system 1 of the engine is driven by a battery 9 (DC power $E_0$ source) or a generator, not shown, for generating the DC power $E_0$.

In the secondary air pump control system 1 constructed as above, when an ignition switch, not shown, of the engine is turned on to apply the DC power (hereinafter referred to as "the supply DC voltage") $E_0$ (12 V) from the battery 9 to the controller 6, the switch 5 is controlled to become closed, whereby the supply DC voltage $E_0$ is applied to the air pump 2 over a predetermined time period to drive the air pump 2 to supply a suitable amount of secondary air into the exhaust passage. By the supply of secondary air, noxious components in the exhaust gases, such as carbon monoxide (CO), are oxidized or the catalyst 46 is activated to purify the exhaust gases. The exhaust gases thus purified are emitted through the exhaust passage into the atmosphere. Further, the voltage $V_{AP}$ applied to the air pump 2 and the electric current $I_{AP}$ flowing through the same are monitored. If the flow rate of secondary air supplied by the air pump 2, obtained from the monitored $V_{AP}$ and $I_{AP}$ values, is deviated from a set value, it is determined that the air pump 2 is in an abnormal state. Then, the abnormal state is displayed by the warning circuit 10, to notify the driver of the abnormal state.

The voltage detector 3 converts the detected voltage $V_{AP}$ applied to the air pump 2 into a digital voltage signal $V_{E0}$ which is then delivered to the controller 6.

The voltage detector 3 is formed by part of a memory or a comparator of a microprocessor constituting the controller 6, and adapted to generate the voltage signal $V_{E0}$ in the form of 8-bit data (256 steps).

The current detector 4 is formed by a noncontact sensor which detects magnetic field strength generated by the direct current, e.g. an ampere meter using a Hall element, and converts the current $I_{AP}$ flowing through the air pump 2 into a digital current signal $I_{E0}$ which is then delivered to the controller 6.

The switch 5 is formed by a switching element, such as a relay, an FET (field effect transistor) or a bipolar transistor having large current capacity, and carries out ON/OFF operation in response to a control signal $K_0$ supplied from the controller 6, to select the supply of the supply DC voltage (battery voltage) $E_0$ to the air pump 2 or the cutoff of the same.

The controller 6 is formed by the microprocessor and its peripheral circuits, and comprised of a flow rate-detecting circuit 7, a switch controller 8, etc.

The flow rate-detecting circuit 7 is comprised of a memory such as a ROM or a RAM storing maximum and minimum values of desired electric power supplied to the air pump 2, desired impedance of the same or desired current flowing through the same, which are set beforehand in a manner corresponding to the flow rate of secondary air, a block having a calculating function, a block having a comparing/determining function, and a timer. The flow rate-detecting circuit 7 calculates pump power Pp, pump impedance Zp, or the like, based on the voltage signal $V_{E0}$ from the voltage detector 3 and the current signal $I_{E0}$ from the current detector 4, and compares results of the calculation with the maximum and minimum values stored in the memory to supply a switch control signal $C_0$ to the switch controller 8 for ON/OFF control of the air pump 2 through the switch 5, as well as determine whether or not the flow rate of secondary air, i.e. the air pump 2 is abnormal. Further, if it is determined that the flow rate is abnormal, a determination signal $H_0$ indicative of the determination result is delivered from the flow rate-detecting circuit 7 to the warning device 10 to notify the driver of the abnormality.

The flow rate-detecting circuit 7 has a timer 14 (FIG. 3) which generates and delivers the switch control signal $C_0$ to the switch controller 8 when a predetermined time period has elapsed after starting of operation of the air pump 2 to thereby interrupt the supply of the supply DC voltage $E_0$.

The switch controller 8 is formed by an output interface circuit, etc. of the microprocessor, and generates and delivers the control signal $K_0$ to the switch 5, based on the switch control signal $C_0$ from the flow rate-detecting circuit 7, to ON/OFF-control the switch 5, to thereby control changeover of supply and cutoff of the supply DC voltage $E_0$ to the air pump 2.

Figure 3:
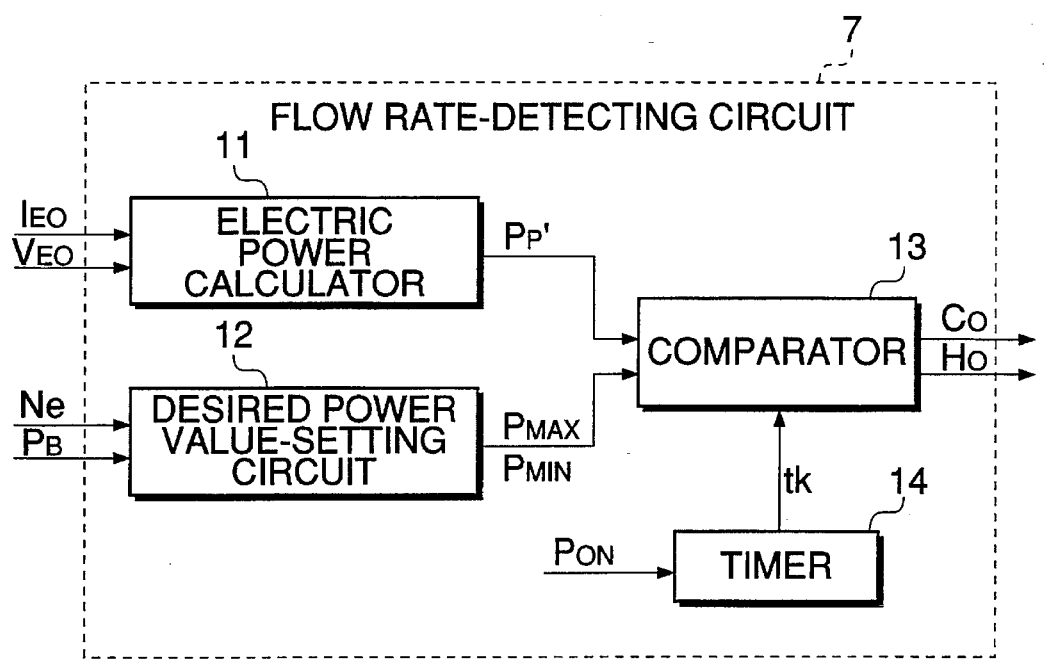
FIG. 3 is a schematic block diagram showing the arrangement of a flow rate-detecting circuit of the secondary air pump control system, appearing in FIG. 2.

FIG. 3 shows the arrangement of the flow rate-detecting circuit 7 appearing in FIG. 2.

According to the present embodiment, the flow rate of secondary air supplied by the air pump 2 is detected based on the pump power Pp calculated from the voltage signal $V_{E0}$ and the current signal $I_{E0}$, and ON/OFF control of the air pump 2 is carried out, and a determination is carried out as to whether or not the flow rate is abnormal, based on results of a comparison between the thus detected flow rate and the maximum value $P_{MAX}$ and minimum value $P_{MIN}$ of the desired electric power.

The flow rate-detecting circuit 7 is comprised of an electric power calculator 11, a desired power value-setting circuit 12, a comparator 13, and the aforementioned timer 14.

The electric power calculator 11 has a multiplying function, and multiplies the value of the voltage signal $V_{E0}$ by the value of the current signal $I_{E0}$ to obtain a value of the pump power Pp ($=V_{E0} \times I_{E0}$) and delivers a pump power signal Pp indicative of the calculated pump power Pp value to the comparator 13.

The desired power value-setting circuit 12 has a calculating function and a memory function, and stores data of flow rate $Q_S$ values corresponding to values of the rotational speed Ne and values of the intake negative pressure $P_B$ of the engine, which were determined based on empirical values and/or design values and stored into the memory, i.e. the ROM or the RAM, and then converts the flow rate $Q_S$ data to the maximum power value $P_{MAX}$ and the minimum power value $P_{MIN}$ of the desired electric power to deliver the thus converted values to the comparator 13.

Figure 5:
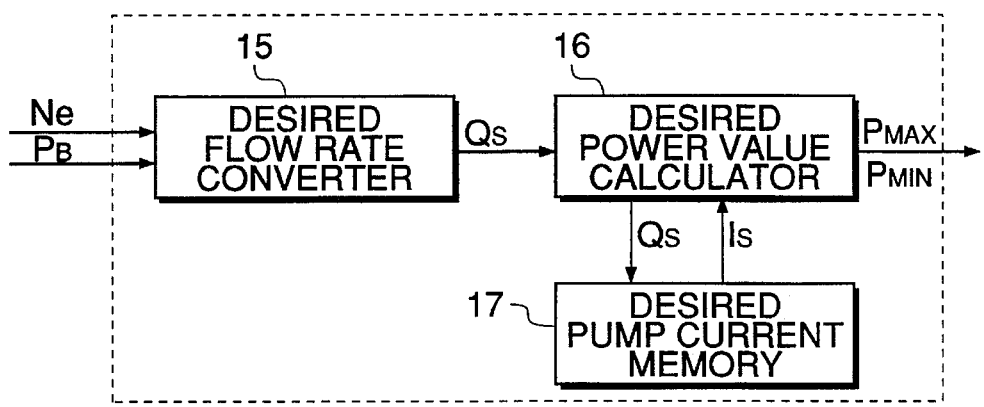
FIG. 5 is a schematic block diagram showing the arrangement of a desired power value-setting circuit appearing in FIG. 3.

FIG. 5 shows the arrangement of the desired power value-setting circuit 12 appearing in FIG. 3.

The desired power value-setting circuit 12 is comprised of a desired flow rate converter 15, a desired power value calculator 16, and a desired pump current memory 17.

The desired flow rate converter 15 is formed by a memory such as a ROM, and stores the secondary air flow rate $Q_S$ data corresponding to combinations of the rotational speed Ne and the intake negative pressure $P_B$ of the engine and supplies a flow rate signal $Q_S'$ commensurate to the rotational speed signal Ne and the intake negative pressure $P_B$ to the desired power value calculator 16.

The desired power value calculator 16 has a conversion control function, a desired power-calculating function, etc., and delivers the flow rate signal $Q_S'$ to the desired pump current memory 17 to read a desired value of the pump current signal $I_S$ corresponding to the value of the flow rate signal $Q_S'$, multiplies the thus read desired pump current $I_S$ value by a value of reference supply voltage $E_0$ (e.g. 12 V) to obtain a value of the desired power $P_S$, and calculates the maximum power value $P_{MAX}$ and the minimum power value $P_{MIN}$ by adding a positive difference ($+\Delta P_S$) and a negative difference ($-\Delta P_S$) as allowable tolerance values to the desired power $P_S$. Thus, signals indicative of the thus calculated maximum power value $P_{MAX}$ and minimum power value $P_{MIN}$ are delivered to the comparator 13.

Figure 4A:
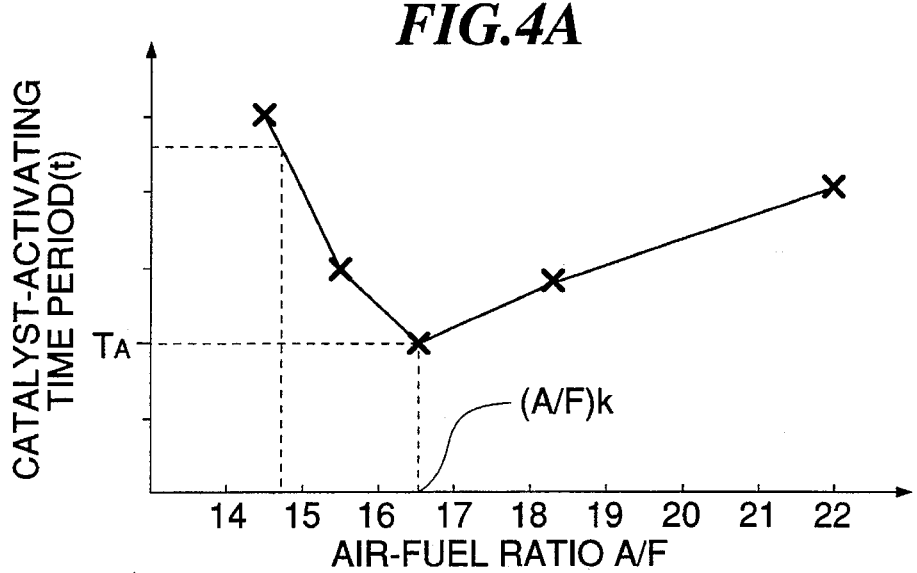
FIG. 4A shows the relationship between the air-fuel ratio A/F of an air-fuel mixture supplied to the engine and a catalyst-activating time period t.
Figure 4B:
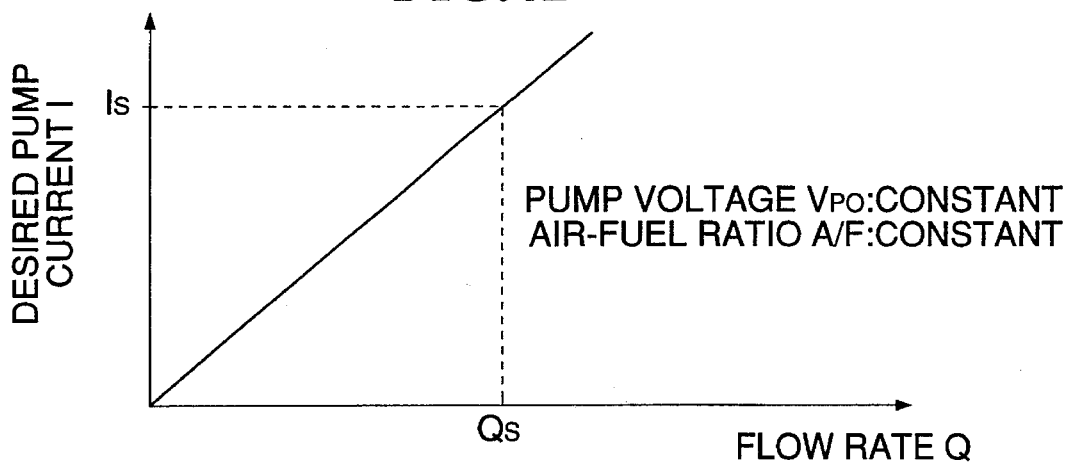
FIG. 4B shows the relationship between a secondary air flow rate $Q_S$ and desired pump current $I_S$.

The desired pump current memory 17 is formed by a memory such as a ROM, where values of the desired pump current $I_S$ are set in a manner corresponding to the flow rate $Q_S$, as shown in FIG. 4B. Responsive to the flow rate signal $Q_S'$ from the desired power value calculator 16, the desired pump current memory 17 selects a value of the desired pump current $I_S$ corresponding to the signal $Q_S'$ and delivers the same to the desired power value calculator 16.

Next, description will be made of the relationship between the flow rate $Q_S$ and the desired pump current $I_S$ stored in the desired pump current memory 17.

FIGS. 4A and 4B show the relationship between the air-fuel ratio A/F of a mixture supplied to the engine and a catalyst activating time period t, and the relationship between the secondary air flow rate $Q_S$ and the desired pump current $I_S$, respectively.

An air-fuel ratio value $(A/F)_K$ at which the activating time period t becomes the minimum value $T_A$ is empirically determined, as shown in FIG. 4A. Then, values of the desired pump current $I_S$ are empirically determined with respect to the flow rate $Q_S$ to be obtained with the air-fuel ratio set to the constant air-fuel ration value $(A/F)_K$ provided that the voltage $V_{AP}$ applied to the air pump 2 is set to a constant value $V_{p0}$, as shown in FIG. 4B.

The comparator 13 has a comparing/determining function, and compares the value Pp of the pump power signal Pp' from the electric power calculator 11 with the maximum power value $P_{MAX}$ and the minimum power value $P_{MIN}$ from the desired power value-setting circuit 12. If the value Pp of the pump power signal Pp' falls outside the range between the minimum power value $P_{MIN}$ and the maximum power value $P_{MAX}$, i.e. if Pp>$P_{MAX}$ or $P_{MIN}$>Pp stands, the comparator 13 delivers the switch control signal $C_0$ at a high level to control the switch controller 8 which is then responsive to the switch control signal $C_0$ to generate the control signal $K_0$ to turn off the switch 5, whereby supply of the supply DC voltage $E_0$ to the air pump 2 is interrupted. Further, the comparator 13 delivers the determination signal $H_0$ having a high level or a predetermined digital value to the warning device 10 to drive the same for warning.

If the pump power value Pp falls within the range between the minimum power value $P_{MIN}$ and the maximum power value $P_{MAX}$, i.e. if $P_{MIN} \leq P_P \leq P_{MAX}$ stands, the comparator 13 delivers the switch control signal $C_0$ at a low level to the switch controller 8 to continue supply of the supply voltage $E_0$ to the air pump 2, while delivering the determination signal $H_0$ having a low level to the warning device 10 to keep the same inoperative.

Thus, when the pump power value Pp exceeds the maximum power value $P_{MAX}$, it is assumed that an abnormality such as clogging of an air supply pipe or seizure of the valve element in the air supply system exists, while when the pump power value Pp is below the minimum power value $P_{MIN}$, it is assumed that an abnormality such as slipout of the air supply pipe in the air supply system exists.

Also in embodiments hereinafter described, similar abnormalities are assumed to exist.

Further, when the comparator 13 receives a timer signal $t_k$ from the timer 14 after a predetermined time period elapses after the start of the engine, it generates and delivers the high-level switch control signal $C_0$ to the switch controller 8 to interrupt supply of the supply DC voltage $E_0$ to the air pump 2. Further, the comparator 13 forcibly supplies the determination signal $H_0$ at a low level to inhibit the warning device 10 from being driven.

The warning device 10 is formed by a visual display, such as an LED arranged on a front panel or the like within the compartment of the vehicle or an audio display such as a voice synthesizer, and notifies the driver in response to the high-level determination signal $H_0$ that the flow rate of secondary air falls outside the predetermined range, by lighting the LED on or causing the synthesizer to be sounded.

Further, the warning device 10 may be constructed such that it is capable of discriminatively notifying whether the secondary air flow rate exceeds the predetermined range or falls below the same, in response to the digital value of the determination signal $H_0$, by means of LED display or synthetic voice.

The timer 14 operates on frequency-divided reference clock pulses to start measurement of an elapsed time period in response to a power-on reset signal $P_{ON}$ generated when the ignition switch is turned on to apply direct current to the controller 6. When the predetermined time period has elapsed, the timer 14 delivers the timer signal $t_k$ to the comparator 13.

As described above, the secondary air pump control system according to the first embodiment is constructed such that the voltage $V_{AP}$ and the current $I_{AP}$ of the air pump 2 which supplies supplying secondary air are detected, the flow rate-detecting circuit 7 of the controller 6 calculates the pump power Pp, based on the detected voltage $V_{AP}$ and current $I_{AP}$, and then determines a value of the desired pump current $I_S$ from the secondary air flow rate $Q_S$ set according to the engine rotational speed Ne and the intake negative pressure $P_B$, followed by calculating the desired power $P_S$, based on the desired pump current $I_S$ and the supply DC voltage $E_0$. Further, the desired power value calculator 16 calculates the maximum power value $P_{MAX}$ and the minimum power value $P_{MIN}$, based on the desired power $P_S$, and then the comparator 13 compares the pump power Pp with the maximum power value $P_{MAX}$ and the minimum power value $P_{MIN}$, to thereby control the operation of the air pump 2 as well as drive the warning device 10, based on results of the comparison. Thus, the flow rate of secondary air supplied into the exhaust pipe can be accurately controlled with reference to the reference flow rate $Q_S$ of secondary air determined according to operating conditions of the engine.

Figure 6:
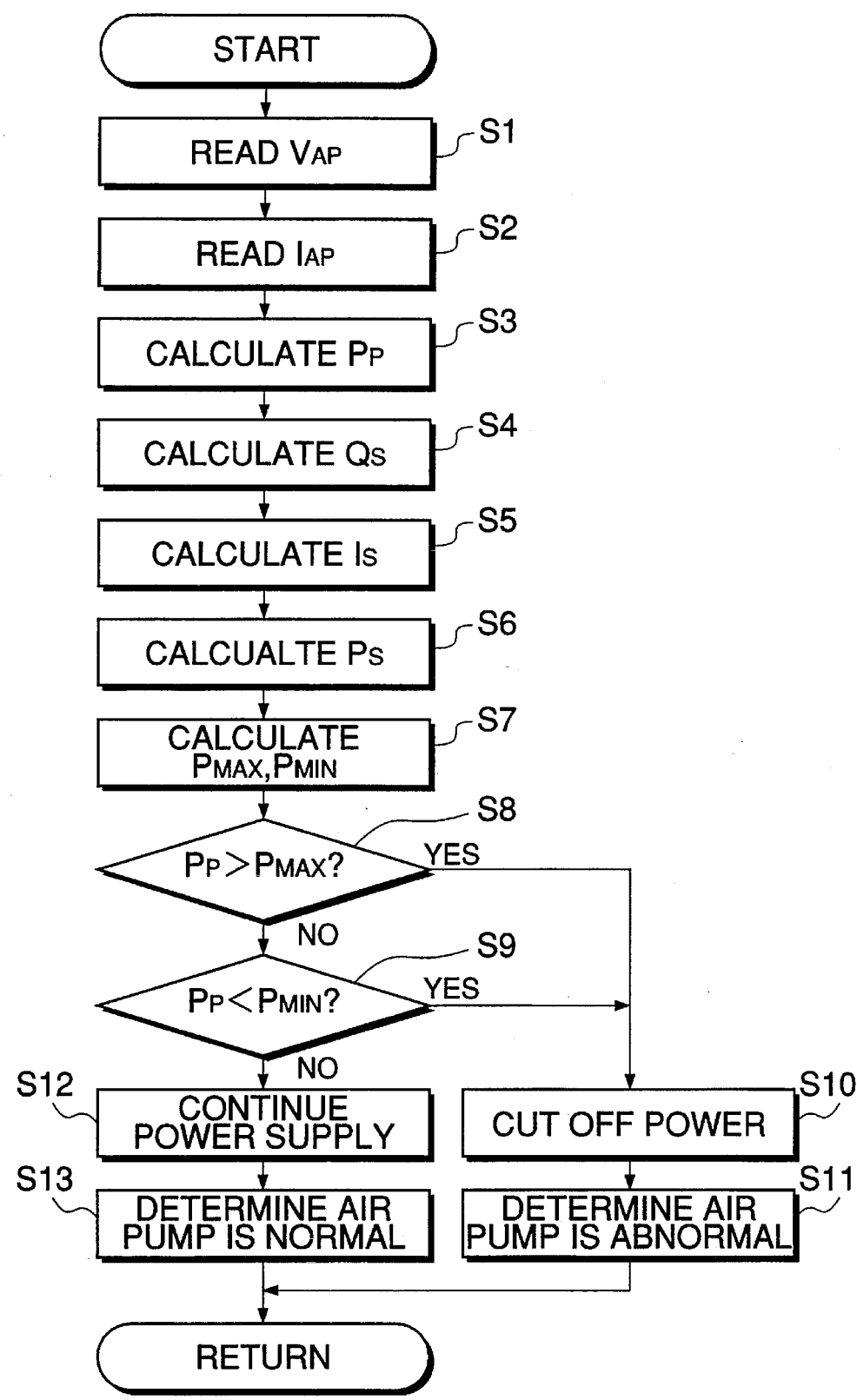
FIG. 6 is a flowchart showing a manner of operation of the air pump control system according to the first embodiment.

FIG. 6 shows a manner of operation carried out by the secondary air pump control system 1 of the present embodiment, particularly the flow rate-detecting circuit 7 of FIG. 3. This program is executed through interrupt processing by the microprocessor at predetermined time intervals after the ignition switch of the vehicle is turned on.

Before the start of the program, the ignition switch of the engine is turned on, and the supply DC voltage $E_0$ is applied to the controller 6. Responsive to the power-on reset signal $P_{ON}$ generated upon the first application of the supply DC voltage $E_0$ to the controller 6, the controller 6 is initialized, thereby permitting the supply DC voltage $E_0$ to be applied to the air pump 2 to start supplying secondary air.

First, at a step S1 the voltage signal $V_{E0}$ from the voltage detector 3, which indicates the voltage $V_{AP}$ applied to the air pump 2, is read in, and at a step S2 the current signal $I_{E0}$ from the current detector 4, which indicates the current $I_{AP}$ flowing through the air pump 2, is read in.

Then, the pump power Pp is calculated based on the voltage signal $V_{E0}$ and the current signal $I_{E0}$ at a step S3, and then the flow rate $Q_S$ is calculated according to the engine rotational speed Ne and the intake negative pressure $P_B$ at a step S4. Further, a value of the desired pump current $I_S$ is determined, which corresponds to the thus calculated flow rate $Q_S$ at a step S5, and then the desired power $P_S$ is calculated from the thus determined desired pump current $I_S$ and the supply DC voltage $E_0$ at a step S6. The maximum power value $P_{MAX}$ and the minimum power value $P_{MIN}$ are calculated from the desired power $P_S$ at a step S7. Then, the pump power Pp is compared with the maximum power value $P_{MAX}$ at a step S8, and with the minimum power value $P_{MIN}$ at a step 9 if the condition of $Pp \leq P_{MAX}$ is fulfilled at the step S8.

If it is determined at the step S8 or S9 that the pump power Pp falls outside a range defined by the maximum power value $P_{MAX}$ and the minimum power value $P_{MIN}$ ($Pp<P_{MIN}$, or $P_{MAX}<Pp$), the comparator 13 delivers the switch control signal $C_0$ having a high level to cut off the supply of power to the air pump 2 at a step S10, and at the same time delivers the high-level determination signal $H_0$, which indicates that the air pump 2 is functioning abnormally, to the warning device 10, at a step S11, whereby the abnormality of the air pump 2 is indicated by the warning device 10.

On the other hand, if the pump power Pp falls within the range defined by the maximum power value $P_{MAX}$ and the minimum power value $P_{MIN}$ ($P_{MIN} \leq Pp \leq P_{MAX}$), the comparator 13 continues to deliver the switch control signal $C_0$ having a low level, thereby permitting power or supply DC voltage $E_0$ to be applied to the air pump 2 until the predetermined time period to elapses, at a step S12. At the same time, it is judged at a step S13 that the air pump 2 is functioning normally.

Figure 7:
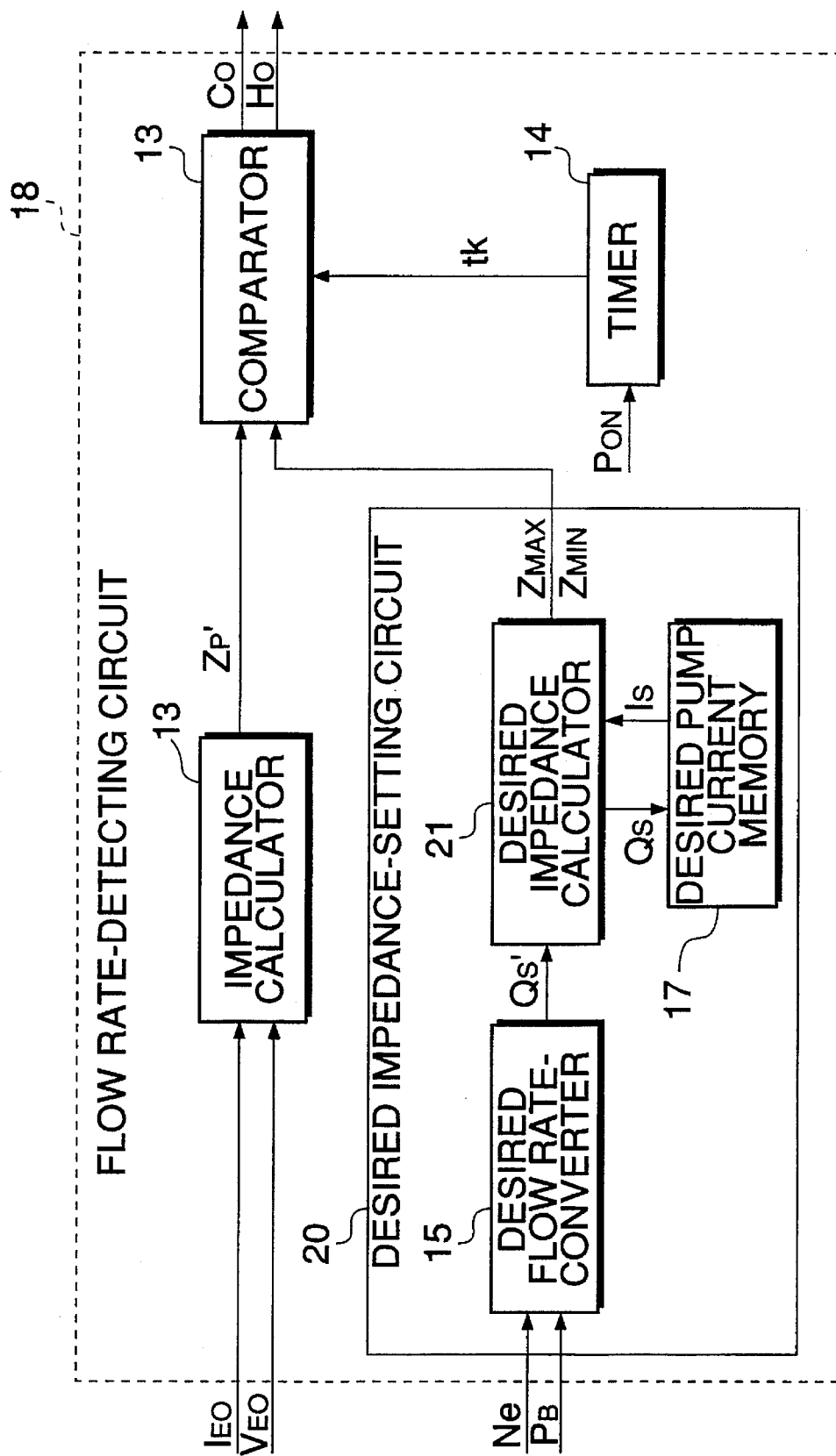
FIG. 7 is a schematic block diagram showing the arrangement of a flow rate-detecting circuit of the air pump control system according to a second embodiment of the invention.

FIG. 7 shows the arrangement of a flow rate-detecting circuit of the secondary air pump control system according to a second embodiment of the invention.

In this embodiment, the flow rate of secondary air supplied by the air pump 2 is detected based on pump impedance Zp which is calculated from the voltage signal $V_{E0}$ and the current signal $I_{E0}$, and ON/OFF control of the air pump 2 is carried out, and a determination is carried out as to whether or not the flow rate is abnormal, based on results of a comparison between the thus calculated pump impedance Zp and the maximum impedance value $Z_{MAX}$ and minimum impedance value $Z_{MIN}$ of the desired impedance.

A flow rate-detecting circuit 18 is provided, which is comprised of an impedance calculator 19, a desired impedance value-setting circuit 20, a comparator 13, and a timer 14.

The impedance calculator 19 has a dividing function, and divides the value of the voltage signal $V_{E0}$ by the value of the current signal $I_{E0}$ to obtain a value of the pump impedance Zp ($=V_{E0}/I_{E0}$), and delivers a pump impedance signal Zp' indicative of the calculated pump impedance Zp to the comparator 13.

The desired impedance-setting circuit 20 is comprised of a desired flow rate converter 15, a desired impedance value calculator 21, and a desired pump current memory 17.

The desired impedance value calculator 21 has a conversion control function, a desired impedance-calculating function, etc., and delivers the flow rate signal $Q_S'$ from the desired flow rate converter 15 to the desired pump current memory 17 to read a value of the desired pump current $I_S$ corresponding to the value Qs of the flow rate signal $Q_S'$, divides the reference supply DC voltage $E_0$ (12 V) by the read value of the desired pump current $I_S$ to obtain a value of the desired impedance $Z_S$ and calculates the maximum impedance value $Z_{MAX}$ and the minimum impedance value $Z_{MIN}$ by adding a positive difference $(+\Delta Z_S)$ and a negative difference $(-\Delta Z_S)$ as allowable tolerance values to the desired impedance $Z_S$. Then, signals indicative of the thus calculated maximum impedance value $Z_{MAX}$ and minimum impedance value $Z_{MIN}$ are delivered to the comparator 13.

The comparator 13, which is similar in construction to the comparator in FIG. 3, compares the pump impedance Zp with the maximum impedance value $Z_{MAX}$ and the minimum impedance value $Z_{MIN}$, and if the pump impedance Zp falls outside a range between the maximum impedance value $Z_{MAX}$ and the minimum impedance value $Z_{MIN}$, i.e. $Zp>Z_{MAX}$ or $Zp<Z_{MIN}$ stands, the switch control signal $C_0$ having a high level is delivered to the switch controller 8 in FIG. 2, to interrupt the supply of the supply voltage $E_0$ to the air pump 2, while the predetermined determination signal $H_0$ having a high level or a predetermined digital value is delivered to the warning device 10, which is similar in construction to the warning device 10 in FIG. 2, to drive the same.

If the pump impedance Zp falls within the range between the maximum impedance value $Z_{MAX}$ and the minimum impedance value $Z_{MIN}$, i.e. if $Z_{MIN} \leq Zp \leq Z_{MAX}$ stands, the switch control signal $C_0$ having a low level is delivered to the switch controller 8 to continue the supply of the supply voltage $E_0$ to the air pump 2, while the determination signal $H_0$ having a low level is delivered to the warning device 10 to keep the same inoperative.

The timer 14 is identical in construction and operation with the timer 14 in FIG. 2, and therefore description thereof is omitted.

As described above, the secondary air pump control system according to the second embodiment is constructed such that the voltage $V_{AP}$ and the current $I_{AP}$ of the air pump 2 are detected, the flow rate-detecting circuit 18 of the controller 6 calculates the pump impedance Pp, based on the detected voltage $V_{AP}$ and current $I_{AP}$, and then determines a value of the desired pump current $I_S$ from the secondary air flow rate $Q_S$ set according to the engine rotational speed Ne and the intake negative pressure $P_B$, followed by calculating the desired impedance $Z_S$, based on the desired pump current $I_S$ and the supply DC voltage $E_0$. Further, the desired impedance-setting circuit 20 sets the maximum impedance value $Z_{MAX}$ and the minimum impedance value $Z_{MIN}$, based on the desired impedance $P_S$, and then the comparator 13 compares the pump impedance Zp with the maximum impedance value $Z_{MAX}$ and the minimum impedance value $Z_{MIN}$, to thereby control the operation of the air pump 2 as well as drive the warning device 10, based on results of the comparison. Thus, the flow rate of secondary air supplied into the exhaust pipe can be accurately controlled with reference to the reference flow rate $Q_S$ of secondary air determined according to operating conditions of the engine.

Figure 8:
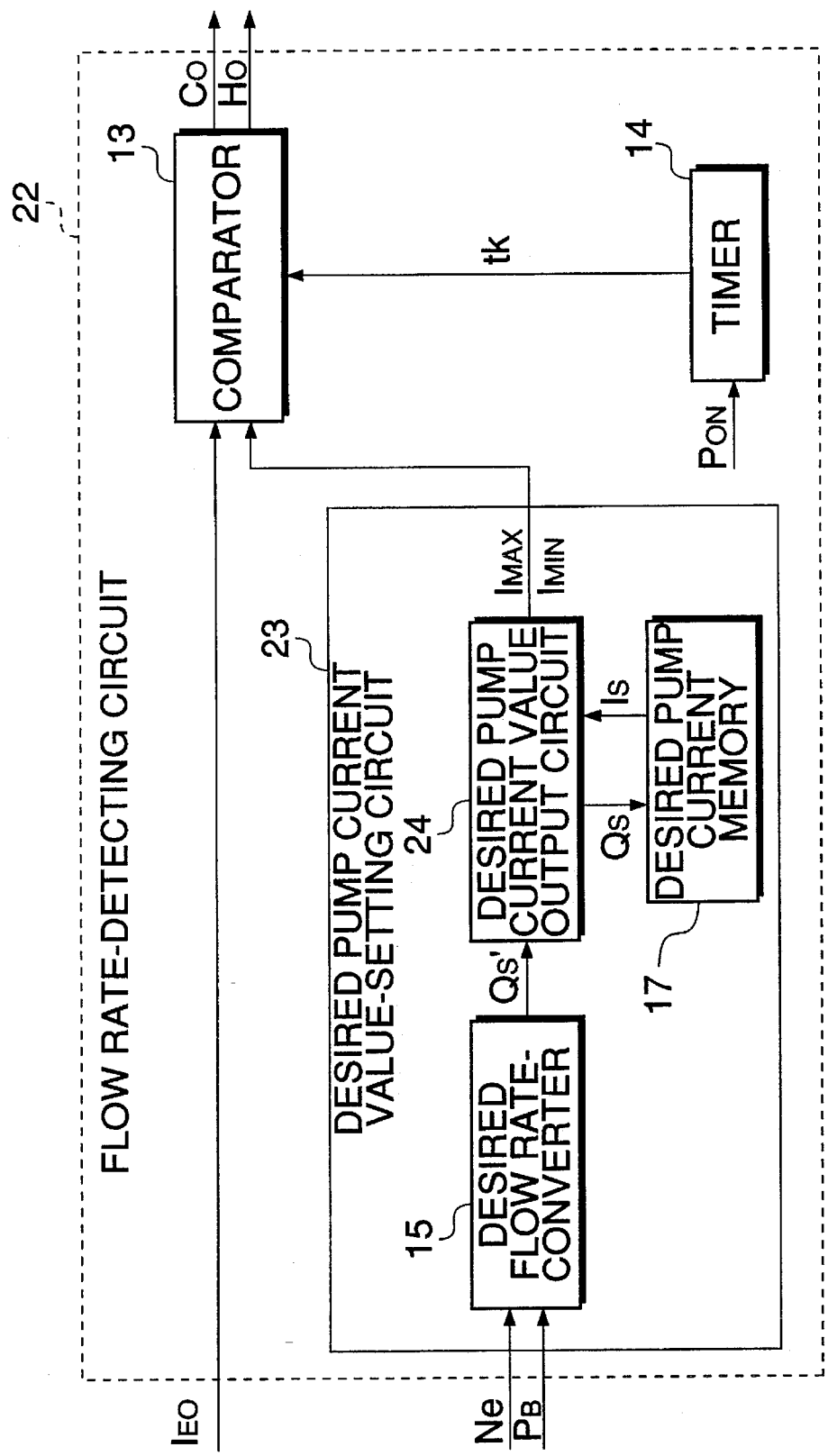
FIG. 8 is a schematic block diagram showing the arrangement of a flow rate-detecting circuit of the air pump control system according to a third embodiment of the invention.

FIG. 8 shows the arrangement of a flow rate-detecting circuit of the secondary air pump control system according to a third embodiment of the invention.

In this embodiment, the flow rate of secondary air supplied by the air pump 2 is detected based on the current signal $I_{E0}$, and ON/OFF control of the air pump 2 is carried out, and a determination is carried out as to whether or not the flow rate is abnormal, based on results of a comparison between the current signal $I_{E0}$ and the maximum value $I_{MAX}$ and minimum value $I_{MIN}$ of the desired pump current I A flow rate-detecting circuit 22 is provided, which is comprised of a desired pump current value-setting circuit 23, a comparator 13, and a timer 14.

The desired pump current value-setting circuit 23 is comprised of a desired flow rate converter 15, a desired pump current value output circuit 24, and a desired pump current memory 17. The desired pump current value output circuit 24 has a converting function, and delivers the flow rate signal $Q_S'$ from the desired flow rate converter 15, to the desired pump current memory 17 to read a value of the desired pump current $I_S$ corresponding to the value $Q_S$ of the flow rate signal $Q_S'$, and calculates the maximum current value $I_{MAX}$ and the minimum current value $I_{MIN}$ by adding a positive difference $(+\Delta I_S)$ and a negative difference $(-\Delta I_S)$ as allowable tolerance values to the desired pump current $I_S$. Then, signals indicative of the thus calculated maximum current value $I_{MAX}$ and minimum current value $I_{MIN}$ are delivered to the comparator 13.

The comparator 13 compares the value of the current signal $I_{E0}$ indicative of the electric current $I_{AP}$ detected by the current detector 4 appearing in FIG. 2, with the maximum current value $I_{MAX}$ and the minimum current value $I_{MIN}$ supplied from the desired pump current value output circuit 24, and if the value of the current signal $I_{E0}$ falls outside a range between the minimum current value $I_{MAX}$ and the maximum current value $I_{MIN}$, i.e. if $I_{E0}>I_{MAX}$ or $I_{MIN}>I_{E0}$ stands, the switch control signal $C_0$ having a high level is delivered to the switch controller 8 to interrupt the supply of the supply DC voltage $E_0$ to the air pump 2, while the determination signal $H_0$ having a high level or a predetermined digital value is delivered to the warning device 10 to drive the same.

If the value of the current signal $I_{E0}$ falls within the range between the maximum current value $I_{MAX}$ and the minimum current value $I_{MIN}$, i.e. if $I_{MIN} \leq I_{E0} \leq I_{MAX}$ stands, the switch control signal $C_0$ having a low level is delivered to the switch controller 8 to continue the supply of the supply voltage $E_0$ to the air pump 2, while the determination signal $H_0$ having a low level is delivered to the warning device 10 to keep the same inoperative.

As described above, the secondary air pump control system according to the third embodiment is constructed such that the current $I_{AP}$ of the air pump 2 is detected, the flow rate-detecting circuit 22 of the controller 6 determines a value of the desired pump current $I_S$ from the secondary air flow rate $Q_S$ set according to the rotational speed Ne and the intake negative pressure $P_B$ of the engine. Further, the desired pump current value outputter 24 calculates the maximum current value $I_{MAX}$ and the minimum current value $I_{MIN}$ of the desired pump current $I_S$, based on the desired pump current $I_S$, and then the comparator 13 compares the value of the current signal $I_{E0}$ with the maximum current value $I_{MAX}$ and the minimum current value $I_{MIN}$, to thereby control the operation of the air pump 2 as well as drive the warning device 10, based on results of the comparison. Thus, the flow rate of secondary air supplied into the exhaust pipe can be accurately controlled with reference to the reference flow rate $Q_S$ of secondary air determined according to operating conditions of the engine.

Figure 9:
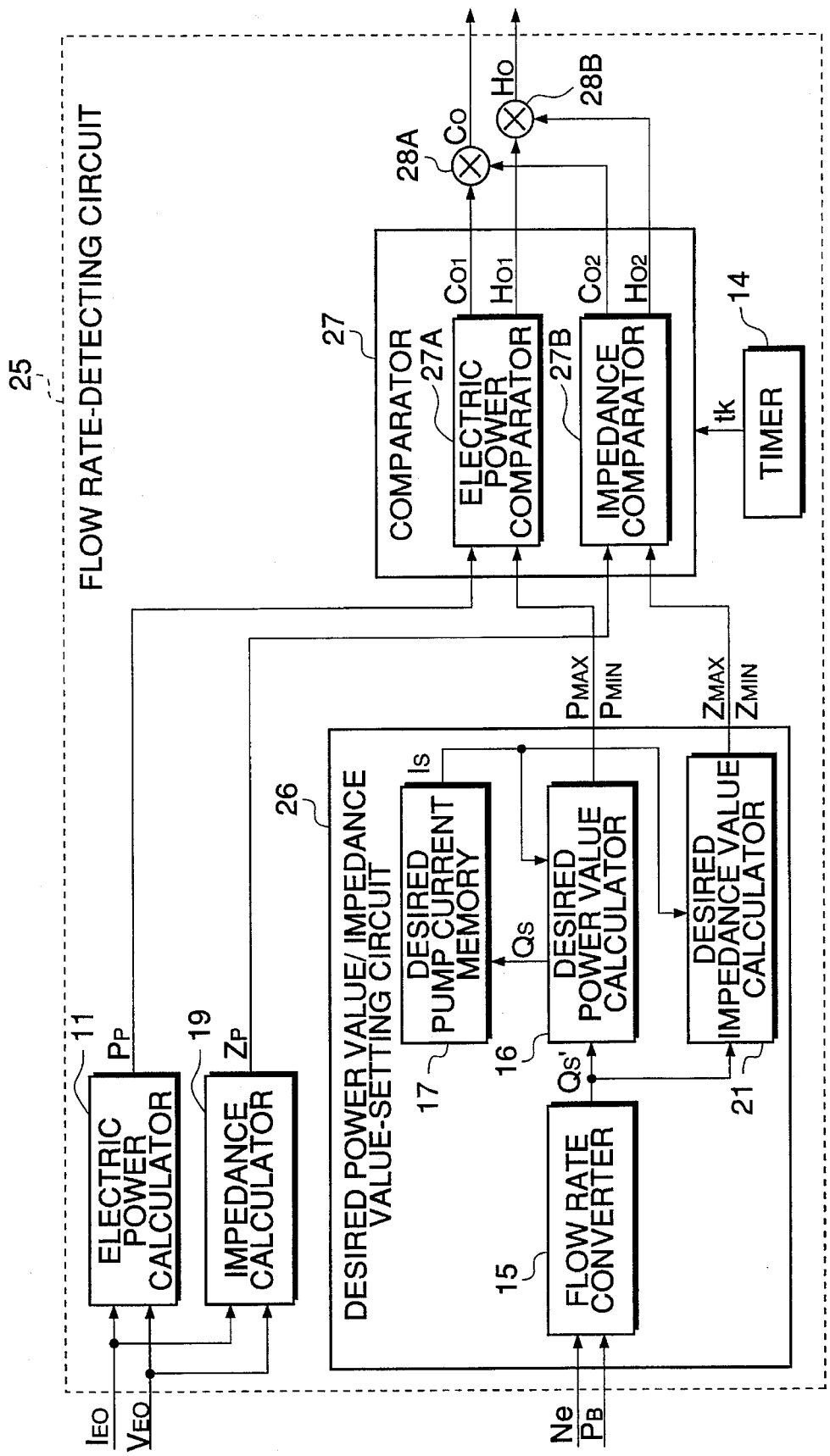
FIG. 9 is a schematic block diagram showing the arrangement of a flow rate-detecting circuit of the air pump control system according to a fourth embodiment of the invention.

FIG. 9 shows the arrangement of a flow rate-detecting circuit of the secondary air control system according to a fourth embodiment of the invention.

In the embodiment, the flow rate of secondary air supplied by the air pump 2 is detected based on the pump power Pp and the pump impedance Zp calculated from the voltage signal $V_{E0}$ and the current signal $I_{E0}$, and ON/OFF control of the air pump 2 is carried out, and a determination is carried out as to whether or not the flow rate is abnormal, based on results of comparisons between the pump power Pp and the maximum power value $P_{MAX}$ and the minimum power value $P_{MIN}$ of the desired pump power $P_S$, and between the pump impedance Zp and the maximum impedance value $Z_{MAX}$ and the minimum impedance value $Z_{MIN}$ of the desired impedance $Z_S$.

A flow rate-detecting circuit 25 is provided, which is comprised of an electric power calculator 11, an impedance calculator 19, a desired power value/impedance value-setting circuit 26, a comparator 27, a timer 14, and AND circuits 28A and 28B.

The electric power calculator 11 is identical in construction and operation with the one in FIG. 3, and calculates the pump power Pp, based on the voltage signal $V_{E0}$ and the current signal $I_{E0}$. The impedance calculator 19 is identical in construction and operation with the one in FIG. 9, and calculates the pump impedance Zp, based on the voltage signal $V_{E0}$ and the current signal $I_{E0}$. These calculated values are delivered to the comparator 27.

The desired power value/impedance value-setting circuit 26 is comprised of a desired flow rate converter 15, a desired power value calculator 16, the desired pump current memory 17, and a desired impedance value calculator 21. The desired power value calculator 16 delivers the flow rate signal $Q_S$ from the desired flow rate converter 15 to the desired pump current memory 17 to read a value of the desired pump current $I_S$ corresponding to the value $Q_S$ of the flow rate signal $Q_S'$, followed by calculating the maximum power value $P_{MAX}$ and the minimum power value $P_{MIN}$ in a manner similar to that described previously with respect to FIG. 5, to thereby deliver signals indicative of the thus calculated maximum power value $P_{MAX}$ and minimum power value $P_{MIN}$ to the comparator 27.

The desired impedance value calculator 21 reads a value of the desired pump current $I_S$ from the desired pump current memory 17, and calculates the maximum impedance value $Z_{MAX}$ and the minimum impedance $Z_{MIN}$ to deliver signals indicative of the calculated values to the comparator 27, in a manner similar to that described previously with respect to FIG. 7.

The comparator 27 is comprised of an electric power comparator 27A and an impedance comparator 27B. The electric power comparator 27A compares the pump power Pp from the electric power calculator 11 with the maximum power value $P_{MAX}$ and the minimum power value $P_{MIN}$ from the desired power value calculator 16, to thereby output a switch control signal $C_{01}$ and a determination signal $H_{01}$. The impedance comparator 27B compares the pump impedance Zp from the impedance calculator 19 with the maximum impedance value $Z_{MAX}$ and the minimum impedance $Z_{MIN}$ from the desired impedance value calculator 21, to thereby output a switch control signal $C_{02}$ and a determination signal $H_{02}$.

The electric power comparator 27A is identical in construction and operation with the comparator 13 in FIG. 3, and if the pump power Pp falls outside the range between the minimum power value $P_{MIN}$ and the maximum power value $P_{MAX}$, i.e. if $Pp>P_{MAX}$ or $P_{MIN}>Pp$ stands, the switch control signal $C_{01}$ having a high level and the determination signal $H_{01}$ having a high level or a predetermined digital value are delivered to the AND circuits 28A and 28B, respectively. If the pump power Pp falls within the above range, i.e. if $P_{MIN} \leq Pp \leq P_{MAX}$ stands, the switch control signal $C_{01}$ having a low level and the determination signal $H_{01}$ having a low level are delivered to the AND circuits 28A and 28B, respectively.

On the other hand, the impedance comparator 27B is identical in construction and operation with the comparator 13 in FIG. 7, and if the pump impedance Zp falls outside the range between the minimum impedance value $Z_{MIN}$ and the maximum impedance value $Z_{MAX}$, i.e. if $Zp>Z_{MAX}$ or $Z_{MIN}>Zp$ stands, the switch control signal $C_{02}$ having a high level and the determination signal $H_{02}$ having a high level or a predetermined digital value are delivered to the AND circuits 28A and 28B, respectively. If the pump impedance Zp falls within the above range, i.e. if $Z_{MIN} \leq Zp \leq Z_{MAX}$ stands, the switch control signal $C_{02}$ having a low level and the determination signal $H_{02}$ having a low level are delivered to the AND circuits 28A and 28B, respectively.

Further, when the electric power comparator 27A and the impedance comparator 27B receive the timer signal $t_k$ from the timer 14, they supply the switch control signals $C_{01}$ and $C_{02}$ both at a high level to the AND circuit 28A.

The AND circuits 28A and 28B carry out AND operations in response to the switch control signals $C_{01}$ and $C_{02}$, and the determination signals $H_{01}$ and $H_{02}$, respectively, to thereby deliver the switch control signal $C_0$ and the determination signal $H_0$ to the switch controller 8 and the warning device 10 in FIG. 2, respectively.

Figure 10:
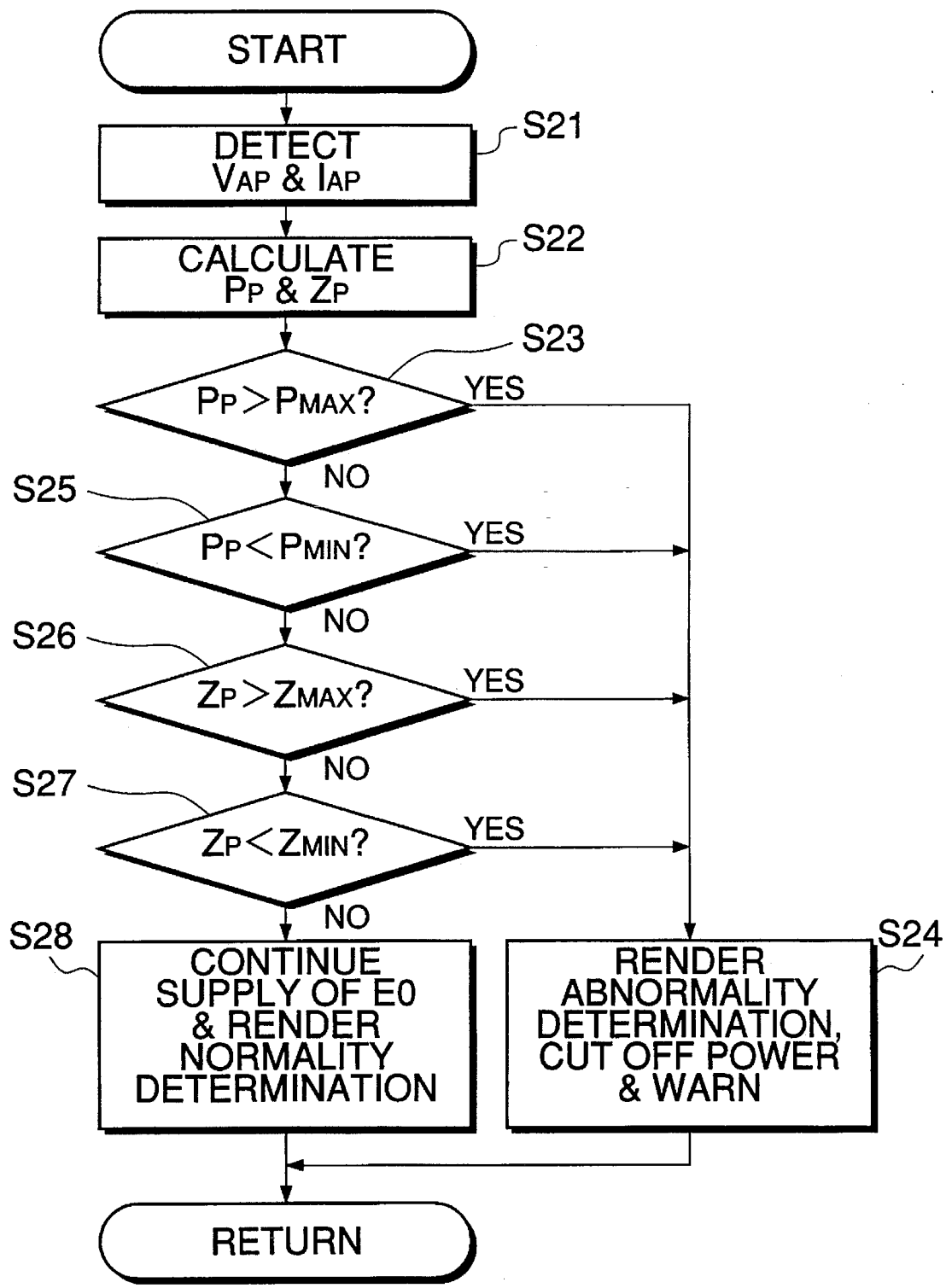
FIG. 10 is a flowchart showing a manner of operation of the air pump control system according to the fourth embodiment.

Next, the operation of the flow rate-detecting circuit of the fourth embodiment will be described with reference to FIG. 10 showing a program for detecting the flow rate of secondary air by the flow rate-detecting circuit of FIG. 9. This program is executed through interrupt processing by the microprocessor at predetermined time intervals after the ignition switch of the engine is turned on.

Before the start of the program, the ignition switch of the engine is turned on, and the supply DC voltage $E_0$ is applied to the controller 6. Responsive to the power-on reset signal $P_{ON}$ generated upon the first application of the supply DC voltage $E_0$ to the controller 6, the controller 6 is initialized, thereby permitting the supply DC voltage $E_0$ to be applied to the air pump 2 to start supply of secondary air.

First, at a step S21, the voltage detector 3 detects the voltage $V_{AP}$ applied to the air pump 2, and the current detector 4 detects the current $I_{AP}$ flowing through the same.

At a step S22, the electric power calculator 1t calculates the pump power Pp, based on the detected voltage $V_{AP}$ and current $I_{AP}$, and the impedance calculator 19 calculates the pump impedance Zp, based on the detected voltage $V_{AP}$ and current $I_{AP}$.

At a step S23, a comparison is made between the maximum power value $P_{MAX}$ calculated by the desired power value calculator 16 and the pump power Pp calculated above, and if the pump power Pp exceeds the maximum power value $P_{MAX}$, i.e. if $PP>P_{MAX}$ stands, the program proceeds to a step S24, wherein supply of the supply DC voltage $E_0$ to the air pump 2 is cut off and it is determined that the flow rate or the air pump 2 is abnormal, and the determination result is displayed by the warning device 10. On the other hand, if the pump power Pp is equal to or less than the maximum power value $P_{MAX}$, i.e. if $PP \leq P_{MAX}$ stands, the program proceeds to a step S25.

At the step S25, a comparison is made between the minimum power value $P_{MIN}$ calculated by the desired power value calculator 16 and the pump power Pp, and if the pump power Pp is less than the minimum power value $P_{MIN}$, i.e. if $PP<P_{MIN}$ stands, the program proceeds to the step S24 to cut off the power supply to the air pump 2, render the abnormality determination and display the determination result by the warning device 10. On the other hand, if the pump power Pp is equal to or more than the minimum power value $P_{MIN}$, i.e. if $Pp \geq P_{MIN}$ stands, the program proceeds to a step S26.

At the step S26, a comparison is made between the pump impedance Zp calculated by the impedance calculator 19 and the maximum impedance value $Z_{MAX}$ calculated by the desired impedance value calculator 21, and if the pump impedance Zp exceeds the maximum impedance value $Z_{MAX}$, i.e. if $Zp > Z_{MAX}$ stands, the program proceeds to the step S24 to cut off the power supply to the air pump 2, render the abnormality determination and display the determination result by the warning device 10. On the other hand, if the pump impedance Zp is equal to or less than the maximum impedance value $Z_{MAX}$, i.e. if $Zp \leq Z_{MAX}$ stands, the program proceeds to a step S27.

At the step S27, a comparison is made between the pump impedance Zp and the minimum impedance value $Z_{MIN}$, and if the pump impedance Zp is less than the minimum impedance value $Z_{MIN}$, i.e. if $Zp < Z_{MIN}$ stands, the program proceeds to the step S24 to cut off the power supply to the air pump 2, render the abnormality determination and display the determination result by the warning device 10. On the other hand, if the pump impedance Zp is equal to or more than the minimum impedance value $Z_{MIN}$, i.e. if $Zp \geq Z_{MIN}$ stands, the program proceeds to a step S28, wherein the power supply to the air pump 2 is continued, and it is determined that the flow rate of secondary air or the air pump is normal.

As described above, the secondary air pump control system according to the fourth embodiment is constructed such that the voltage $V_{AP}$ and the current $I_{AP}$ of the air pump are detected, the flow rate-detecting circuit 25 of the controller 6 calculates the pump power Pp and the pump impedance Zp, based on the voltage $V_{AP}$ and the current $I_{AP}$, and then determines a value of the desired pump current $I_S$ from the secondary air flow rate $Q_S$ set according to the engine rotational speed Ne and the intake negative pressure $P_B$. Next, the desired power value calculator 16 calculates the desired power value $P_S$, followed by calculating the maximum power value $P_{MAX}$ and the minimum power value $P_{MIN}$ from the desired power value $P_S$, and the desired impedance value calculator 21 calculates the desired impedance value $Z_S$ and also the maximum impedance value $Z_{MAX}$ and the minimum impedance value $Z_{MIN}$ from the desired impedance value $Z_S$. Further, the electric power comparator 27A compares the pump power Pp with the maximum power value $P_{MAX}$ and the minimum power value $P_{MIN}$, while the impedance comparator 27B compares the pump impedance Zp with the maximum impedance value $Z_{MAX}$ and the minimum impedance value $Z_{MIN}$, to thereby control the operation of the air pump 2 as well as drive the warning device 10, based on results of the comparisons. Thus, the flow rate of secondary air supplied into the exhaust pipe can be accurately controlled with reference to the reference flow rate $Q_S$ of secondary air determined according to operating conditions of the engine.

FIG. 11 shows the arrangement of a flow rate-detecting circuit of the secondary air pump control system according to a fifth embodiment of the invention.

In this embodiment, the flow rate of secondary air supplied by the air pump 2 is detected based on the pump impedance Zp calculated from the voltage signal $V_{E0}$ and the current signal $I_{E0}$, and ON/OFF control of the air pump 2 is carried out, and a determination is carried out as to whether or not the flow rate is abnormal, based on results of comparisons between the value of the current signal $I_{E0}$ and the maximum value $I_{MAX}$ and minimum value $I_{MIN}$ of the desired pump current $I_S$, and between the pump impedance zp and the maximum value $Z_{MAX}$ and minimum value $Z_{MIN}$ of the pump impedance $Z_S$.

A flow rate-detecting circuit 29 is provided, which is comprised of an impedance calculator 19, a desired electric current value/impedance value-setting circuit 30, a comparator 31, a timer 14, and AND circuit 28A and 28B.

The impedance calculator 19 is identical in construction and operation with the one in FIG. 7, and calculates the pump impedance Zp, based on the voltage signal $V_{E0}$ and the current signal $I_{E0}$ to deliver the calculated pump impedance Zp to the comparator 31.

The desired electric current value/impedance value-setting circuit 30 is comprised of a desired flow rate converter 15, a desired pump current value output circuit 24, a desired impedance value calculator 21, and a desired pump current memory 17. The desired pump current value output circuit 24 supplies the flow rate signal $Q_S'$ from the desired flow rate converter 15 to the desired pump current memory 17, and reads a value of the desired pump current $I_S$ corresponding to the flow rate $Q_S$, followed by calculating the maximum current value $I_{MAX}$ and the minimum current value $I_{MIN}$ in a manner similar to that described in FIG. 8, to thereby deliver signals indicative of the maximum current value $I_{MAX}$ and the minimum current value $I_{MIN}$ to the comparator 31.

The desired impedance value calculator 21 also reads a value of the desired pump current signal $I_S$, to thereby calculate the maximum impedance value $Z_{MAX}$ and the minimum impedance value $Z_{MIN}$ in a manner similar to that described with respect to FIG. 8, to thereby deliver signals indicative of the maximum impedance $Z_{MAX}$ and the minimum impedance $Z_{MIN}$ to the comparator 31.

The comparator 31 is comprised of a current comparator 31A and an impedance comparator 27B. The current comparator 31A compares the value of the current signal $I_{E0}$ indicative of the current $I_{AP}$ detected by the current detector 4 with the maximum current value $I_{MAX}$ and the minimum current value $I_{MIN}$ supplied from the desired pump current value output circuit 24, and if the value of the current value signal $I_{E0}$ falls outside the range between the minimum current value $I_{MIN}$ and the maximum current value $I_{MAX}$, i.e. if $I_{E0} > I_{MAX}$ or $I_{MIN} > I_{E0}$ stands, the comparator 31A delivers the switch control signal $C_{01}$ having a high level and the determination signal $H_{01}$ having a high level or a predetermined digital value to the AND circuit 28B, whereas if the value of the current value signal $I_{E0}$ falls within the range between the minimum current value signal $I_{MIN}$ and the maximum current $I_{MAX}$, i.e. if $I_{MIN} \leq I_{E0} \leq I_{MAX}$ stands, the comparator 31A delivers the switch control signal $C_{01}$ having a low level and the determination signal $H_{01}$ having a low level to the AND circuit 28B.

The impedance comparator 27B compares the pump impedance Zp with the minimum impedance value $Z_{MIN}$ and the maximum impedance value $Z_{MAX}$, and outputs the switch control signal $C_{02}$ and the determination signal $H_{02}$ at levels based on results of the comparison to the AND circuit 28B, similarly to the impedance comparator 27B in FIG. 9.

The switch control signals $C_{01}$ and $C_{02}$ from the comparator 31 have their levels controlled in manners similar to those in FIG. 9, and the AND circuits 28A and 28B are identical in construction and operation with those in FIG. 9, and therefore description thereof is omitted.

As described above, the secondary air pump control system according to the fifth embodiment is constructed such that the voltage $V_{AP}$ and the current $I_{AP}$ of the air pump 2 are detected, the flow rate detector 29 of the controller 6 calculates the pump impedance Zp, based on the voltage $V_{AP}$ and the current $I_{AP}$, and then determines a value of the desired pump current $I_S$ from the secondary air flow rate $Q_S$ set according to the engine rotational speed Ne and the intake negative pressure $P_B$, The flow rate-detecting circuit 29 also calculates the desired impedance $Z_S$, based on the desired current $I_S$ and the supply DC voltage $E_0$. Further, the desired pump current value output circuit 24 calculates the maximum current value $I_{MAX}$ and the minimum current value $I_{MIN}$, based on the desired pump current $I_S$, and the desired impedance value calculator 21 calculates the maximum impedance value $Z_{MAX}$ and the minimum impedance value $Z_{MIN}$, based on the desired impedance $Z_S$, followed by comparisons being made between the value of the current signal $I_{E0}$ and the maximum current value $I_{MAX}$ and the minimum current value $I_{MIN}$, and between the pump impedance Zp and the maximum impedance value $Z_{MAX}$ and the minimum impedance value $Z_{MIN}$, to thereby control the operation of the air pump 2 as well as drive the warning device 10, based on results of the comparisons. Thus, the flow rate of secondary air supplied into the exhaust pipe can be accurately controlled with reference to the reference flow rate $Q_S$ of secondary air determined according to operating conditions of the engine.

The operations carried out by the flow rate-detecting circuits of FIGS. 7, 8 and 11 are similar to the operations described previously with reference to the flowcharts of FIGS. 6 and 10, and description thereof is therefore omitted.

Figure 12A:
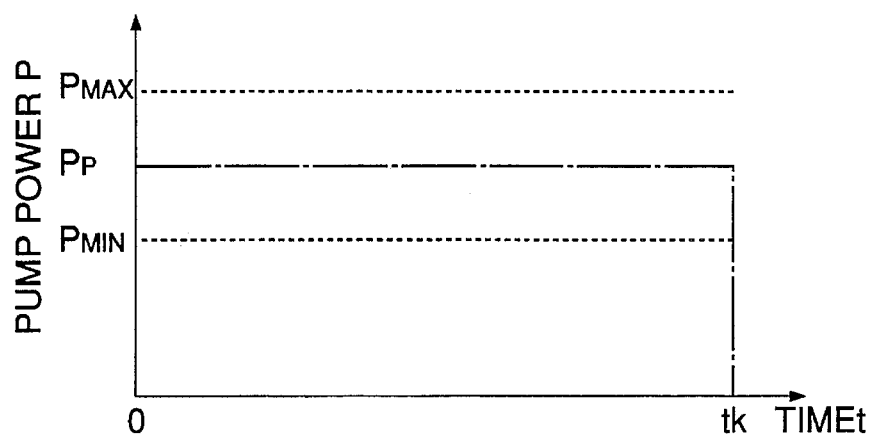
FIG. 12A is a graph showing a pump power characteristic detected by the flow rate-detecting circuit of FIG. 3 plotted with the lapse of time.
Figure 12B:
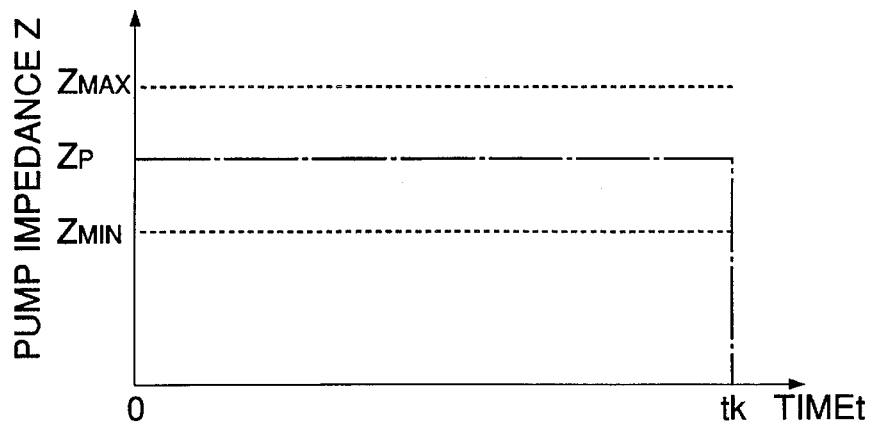
FIG. 12B is a graph showing a pump impedance characteristic detected by the flow rate-detecting circuit of FIG. 7 plotted with the lapse of time.
Figure 12C:
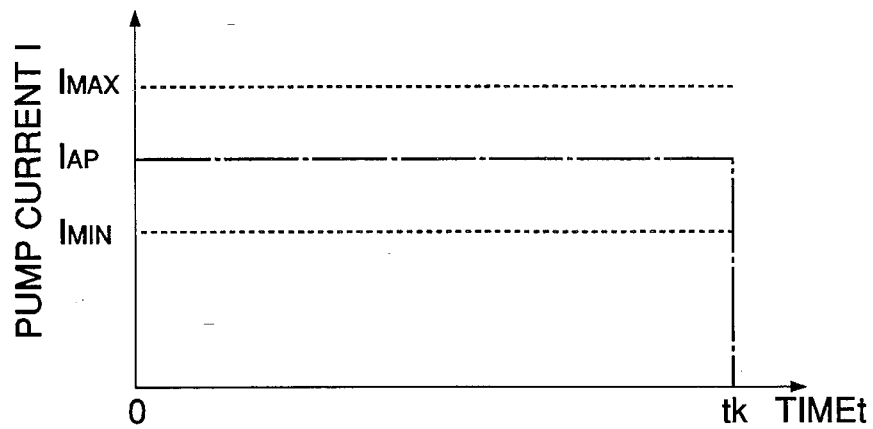
FIG. 12C is a graph showing a pump current characteristic detected by the flow rate-detecting circuit of FIG. 8 plotted with the lapse of time.

FIGS. 12A to 12C show characteristics of the pump power, pump impedance, and pump current detected by the flow rate-detecting circuit 7, 18 and 22, of FIGS. 3, 7 and 8, respectively, plotted with the lapse of time. As is clear from FIGS. 12A to 12C, the actual detected values of the above parameters are compared with the respective maximum values and minimum values ($P_{MAX}$, $P_{MIN}$; $Z_{MAX}$, $Z_{MIN}$; and $I_{MAX}$, $I_{MIN}$) which are set to constant values with the lapse of time, to accurately determine the actual flow rate of secondary air with respect to the reference flow rate $Q_S$,

What is claimed is:

1. A secondary air pump control system for an internal combustion engine having an exhaust passage, and an air pump for supplying secondary air to said exhaust passage, comprising:

voltage-detecting means for detecting voltage applied to said air pump;

current-detecting means for detecting current flowing through said air pump;

switch means for making a changeover between supply of electric power to said air pump and cutoff of same;

flow rate-detecting means for detecting a flow rate of secondary air supplied by said air pump, based on an output from said voltage-detecting means and an output from said current-detecting means; and switch control means for controlling operation of said switch means, based on an output from said flow rate-detecting means.

2. A secondary air pump control system as claimed in claim 1, including abnormality-detecting/warning means for detecting and warning an abnormality of said air pump, based on said output from said flow rate-detecting means.

3. A secondary air pump control system as claimed in claim 1 or 2, wherein said flow rate-detecting means comprises electric power-calculating means for calculating an actual value of pump power supplied to said air pump, based on said output from said voltage-detecting means and said output from said current-detecting means, desired power value-setting means for setting a desired value of said pump power to be supplied to said air pump, and comparing means for comparing said actual value of said pump power thus calculated with said desired value of said pump power thus set, and for determining said flow rate of secondary air supplied by said air pump, based on a result of said comparison.

4. A secondary air pump control system as claimed in claim 3, wherein said desired power value-setting means sets said desired value of said pump power, based on operating conditions of said engine.

5. A secondary air pump control system as claimed in claim 1 or 2, wherein said flow rate-detecting means comprises impedance-calculating means for calculating an actual value of pump impedance of said air pump, based on said output from said voltage-detecting means and said output from said current-detecting means, desired impedance value-setting means for setting a desired value of said pump impedance, and comparing means for comparing said actual value of said pump impedance thus calculated with said desired value of said pump impedance thus set, and for determining said flow rate of secondary air supplied by said air pump, based on a result of said comparison.

6. A secondary air pump control system as claimed in claim 5, wherein said desired impedance value-setting means sets said desired value of said pump impedance, based on operating conditions of said engine.

7. A secondary air pump control system as claimed in claim 1 or 2, wherein said flow rate-detecting means comprises electric power-calculating means for calculating an actual value of pump power supplied to said air pump, based on said output from said voltage-detecting means and said output from said current-detecting means, desired power value-setting means for setting a desired value of said pump power to be supplied to said air pump, impedance-calculating means for calculating an actual value of pump impedance of said air pump, based on said output from said voltage-detecting means and said output from said current-detecting means, desired impedance value-setting means for setting a desired value of said pump impedance, and comparing means for comparing said actual value of said pump power thus calculated and said actual value of said pump impedance thus calculated with said desired value of said pump power thus set and said desired value of said pump impedance thus set, respectively, and for determining said flow rate of said secondary air supplied by said air pump, based on results of said comparisons.

8. A secondary air pump control system as claimed in claim 7, wherein said desired power value-setting means sets said desired value of said pump power, based on operating conditions of said engine.

9. A secondary air pump control system as claimed in claim 7, wherein said desired impedance value-setting means sets said desired value of said pump impedance, based on operating conditions of said engine.

10. A secondary air pump control system as claimed in claim 1 or 2, wherein said flow rate-detecting means comprises impedance-calculating means for calculating an actual value of pump impedance of said air pump, based on said output from said voltage-detecting means and said output from said current-detecting means, desired impedance value-setting means for setting a desired value of said pump impedance, desired current value-setting means for setting a desired value of current to flow through said air pump, and comparing means for comparing said actual value of said pump impedance thus calculated and said actual value of said current detected by said current-detecting means with said desired value of said pump impedance thus set and said desired value of said current thus set, respectively, and for determining said flow rate of secondary air supplied by said air pump, based on results of said comparisons.

11. A secondary air pump control system as claimed in claim 10, wherein said desired impedance value-setting means sets said desired value of said pump impedance, based on operating conditions of said engine.

12. A secondary air pump control system as claimed in claim 10, wherein said desired current value-setting means sets said desired value of said current, based on operating conditions of said engine.

13. A secondary air pump control system as claimed in claim 1 or 2, wherein said current-detecting means comprises a non-contact type detector.

14. A secondary air pump control system for an internal combustion engine having an exhaust passage, and an air pump for supplying secondary air to said exhaust passage, comprising:

current-detecting means for detecting an actual value of current flowing through said air pump;

desired current value-setting means for setting a desired value of current to flow through said air pump, based on operating conditions of said engine;

switch means for making a changeover between supply of electric power to said air pump and cutoff of same;

flow rate-detecting means for comparing said actual value of said current thus detected with said desired value of said current thus set, and for determining a flow rate of secondary air supplied by said air pump, based on a result of said comparison; and switch control means for controlling operation of said switch means, based on an output from said flow rate-detecting means.

15. A secondary air pump control system as claimed in claim 14, including abnormality-detecting/warning means for detecting and warning an abnormality of said air pump, based on said output from said flow rate-detecting means.

16. A secondary air pump control system as claimed in claim 14 or 15, wherein said current-detecting means comprises a non-contact type detector.

17. A secondary air pump control system for an internal combustion engine having an exhaust passage, and an air pump for supplying secondary air to said exhaust passage, comprising:

voltage-detecting means for detecting voltage applied to said air pump;

current-detecting means for detecting current flowing through said air pump;

switch means for making a changeover between supply of electric power to said air pump and cutoff of same;

flow rate-detecting means for detecting a flow rate of secondary air supplied by said air pump, based on an output from said voltage-detecting means and an output from said current-detecting means; and abnormality-detecting/warning means for detecting and warning an abnormality of said air pump, based on an output from said flow rate-detecting means.

18. A secondary air pump control system for an internal combustion engine having an exhaust passage, and an air pump for supplying secondary air to said exhaust passage, comprising:

current-detecting means for detecting current flowing through said air pump;

desired current value-setting means for setting desired current to flow through said air pump, based on operating conditions of said engine;

switch means for making a changeover between supply of electric power to said air pump and cutoff of same;

flow rate-detecting means for comparing said electric current thus detected with said desired current value thus set, and for determining a flow rate of secondary air supplied by said air pump, based on a result of said comparison; and abnormality-detecting/warning means for detecting and warning an abnormality of said air pump, based on an output from said flow rate-detecting means.

* * * * *